Patented Aug. 23, 1938

2,127,811

UNITED STATES PATENT OFFICE 2,127,811

PROCESS FOR MANUFACTURING LUBRICATING OILS

Egon Eichwald, Amsterdam, Netherlands, assignor to Shell Development Company, San Francisco, Calif., a corporation of Delaware No Drawing. Application June 15, 1936, Serial No. 85,332. In the Netherlands August 29, 1933

15 Claims. (Cl. 260—407)

This invention deals with the manufacture of polymerized fatty oils suitable for lubrication, and in particular is related to polymerization of fatty oils with boron fluoride.

This application is a continuation-in-part of my copending application, Serial No. 741,300, filed August 24, 1934, in which I have described in a general way the polymerization of fatty oils with active polymerization catalysts. According to this process a fatty oil, such as rapeseed oil, is polymerized with a halide of the 2nd or 3rd group of the periodic system. The polymer so produced is dissolved in benzol or other low boiling hydrocarbons, the resulting solution is washed with aqueous alcohol, the washed layer is separated and the solvent is evaporated. The finished polymer is then blended with mineral lubricating oils or greases, usually in quantities of about 3% to 10%, for the purpose of improving the latter, particularly with respect to viscosity index and oiliness.

I have now discovered that anhydrous boron fluoride, if applied to fatty oils which are properly selected, under the proper treating conditions, leads to the production of polymers which are better and more suitable for lubricating purposes than the polymers produced by means of other catalysts, such as aluminum chloride, beryllium fluoride, zinc chloride, etc.

The advantage of anhydrous boron fluoride over other polymerization catalysts resides in its ability to polymerize certain semi-drying fatty oils to stable polymers, not only at a higher rate but also to a higher degree. Both of these factors are of great importance, as will be shown hereinafter.

The degree of polymerization is measured for practical purposes by a unit which I shall call the viscosity-raising coefficient. For the determination of this coefficient the degree of polymerization of a polymer which is produced by electrical voltolization of rapeseed oil and which, when added in a concentration of 6% to a viscous hydrocarbon oil having a viscosity of about 280 Saybolt at 50° C. raises this viscosity to 444.5 Saybolt at 50° C. is taken as unit. The coefficient is calculated according to $$\frac{(\log V_E - \log V_A)}{6} \cdot K = \text{Viscosity-raising coefficient}$$

in which equation $V_E$ is the Saybolt viscosity at 50° C. of a 6% solution of polymer in viscous hydrocarbon oil having at 50° C. a viscosity of about 280 Saybolt and a V.I. of about 40 and $V_A$ is the Saybolt viscosity at 50° C. of the viscous hydrocarbon oil, whilst K is a constant which is calculated according to $$\frac{(\log V_e - \log V_A)}{6} \cdot K = 1$$

wherein $V_e$ is the Saybolt viscosity at 50° C. of a 6% solution of the above voltolized rapeseed oil in the hydrocarbon oil employed, from which follows a value for K of 29.54.

While the ability of the polymer to raise the viscosity of lubricating oils is, in itself, not of primary importance, other important properties relating to lubricity, such as its ability to raise the viscosity index and oiliness, also improve with increasing viscosity-raising coefficient; and since the viscosity-raising coefficient is easy to determine, I take it as an approximate measure for the quality of other properties which relate to lubricity.

It was found that with boron fluoride it was possible to produce polymers having a viscosity-raising coefficient considerably in excess of 1 at a cost which is much lower than that required to produce a standard polymer by the electrical method. The best polymers obtainable with other polymerizing catalysts were found to have coefficients usually not exceeding 0.5.

Besides the above-mentioned properties it is necessary to consider stability, acid value, and solubility of the polymer in hydrocarbon oils. Stability is important from two angles: first, that concerning resistance of the blended lubricant to breakdown and loss of viscosity upon use; and second, that of resistance to resinification. Breakdown upon use appears to be due to the presence of some extra large polymers which are mechanically disrupted upon use. Difficulties from this source are relatively small, if the polymer was prepared under the proper polymerization conditions. Resinification may occur if the polymer is of unsaturated character. This may happen with polymers produced from quick-drying oils. In order to manufacture polymers which in the absence of special stabilizing treatments are free from a tendency to break down and to resinify, it is necessary that the fatty oil used in the polymerization has a limited unsaturation. A certain degree of unsaturation is necessary to enable polymerization to take place, but this degree should be so limited that when polymerization has progressed to the desired point, the number of double bonds per molecule of polymer is sufficiently low to prevent the polymer from further polymerization under conditions to which a lubricating oil may be exposed. I have found that semi-drying oils having iodine numbers of the order of 90 to 120, or mixtures of predominating quantities of such semi-drying oils with small quantities of drying oils of moderate drying qualities preferably having iodine numbers below about 150, produce polymers which are substantially free from a tendency to break down upon use, or to resinify. Excellent hydrocarbon oil-soluble polymers, i. e., polymers having a viscosity-raising coefficient above 0.7, are obtained with fatty oil mixtures having iodine numbers of about 100 to 125. Examples of suitable semi-drying oils are rapeseed oil, cottonseed oil, corn oil, sesame oil, rice oil, mustard-seed oil. Among the drying oils soya bean oil, sunflower oil, and poppy seed oil may be mentioned. I have obtained particularly favorable results by using mixtures containing from 5 to 30% soya bean oil and from 95 to 70% rapeseed oil.

If it is desired to produce mineral oil-soluble stable polymers which do not tend to resinify from fatty oils or mixtures thereof having iodine numbers in excess of those herein indicated, it is necessary to stabilize the polymers by a suitable treatment, such as hydrogenation. Or else drying oils may be hydrogenated to reduce their iodine number to within the required limitation and the partially hydrogenated fatty oil may then be subjected to my polymerization process.

Polymerization is normally carried out in the absence of diluents. Under some circumstances, however, for instance when the fatty oil has a high iodine number it may be dissolved in a suitable inert solvent, such as naphtha, benzene, kerosene, lubricating distillate, chlorinated hydrocarbons, etc. Dilution usually has the effect of reducing the rate of polymerization.

While polymerization proceeds under the influence of boron fluoride, a side reaction takes place which results in the liberation of fatty acids. This reaction is neither a true saponification nor hydrolysis, alkali and water being absent. Since, however, its mechanism is not fully understood, I call this reaction hydrolysis for the purpose of identification.

As already mentioned, acid value of the polymer is of importance, not only because of the possible harmful effect of acids on bearings and the like, but also because of a peculiar inhibiting effect which the fatty acids exhibit on the progress of the polymerization reaction. If the organic acidity during the polymerization is allowed to rise to a certain point, polymerization stops altogether. For this reason conditions during polymerization must be such as favor polymerization over hydrolysis.

The three main factors which affect the relative progress of the two reactions are time, temperature and concentration of boron fluoride. With regard to time, I have found that the slower polymerization proceeds, the more free fatty acid is developed based on the production of a polymer having a certain viscosity-raising coefficient. Hence the time in which to complete polymerization should be shortened as much as possible. One way to accomplish this is to select fatty oils of a high degree of unsaturation, which degree, however, must be within the limits and for the reasons hereinbefore mentioned. Mixtures of semi-drying and drying oils of the type described require much less time than semi-drying oils alone. For example, whereas it takes about 260 hours to polymerize rapeseed oil under optimum conditions, a blend of 4 parts rapeseed oil and one part of soya bean oil may be fully polymerized in less than 60 hours.

Temperature is an important factor in the relative promotion of polymerization and hydrolysis. The optimum temperature favoring polymerization varies somewhat for various oils or blends thereof. As a general rule, most favorable results are obtained at elevated temperatures, such as between 70 and 100° C. Rapeseed oil, or mixtures of rapeseed oil and soya bean oil readily polymerize within that range, the optimum temperature being at about 80° C. For oils of relatively high iodine number which polymerize comparatively rapidly a wider temperature range is applicable.

The quantity of boron fluoride used in the reaction also affects the relative progress of polymerization against hydrolysis. Normally an amount of boron fluoride above 1% and below 2% by weight causes polymerization to progress satisfactorily, although lower or higher concentrations may be used. Also with 2% by weight of boron fluoride the process proceeds satisfactorily, but when using boron fluoride in amounts exceeding about 3 to 5% by weight, difficulties are encountered, due to a relatively highly increased formation of free organic acids. Polymers of lowest acidity are obtained when the boron fluoride content is kept at below 1½%. Acid values of the polymers, if produced under proper conditions and after removal of inorganic acids, are usually below 10 and often below 5 milligrams KOH per gram of oil. Relatively small deviations from optimum conditions, however, may cause the acid value to rise to 20 and higher.

If it is desired to obtain a finished polymer of an acid value lower than that which can be obtained even under the most favorable polymerization conditions, two methods are applicable to accomplish this. The free organic acids may be neutralized with a suitable organic or inorganic base, or they may be extracted with a suitable solvent. Bases to be suitable must be strong enough to produce salts with fatty acids which resist hydrolysis under ordinary lubricating conditions, and also must be relatively non-volatile. Satisfactory results are obtained with quaternary nitrogen bases, particularly those containing at least one aromatic group. Examples of such bases are tetra ethyl ammonium, tri-methyl p-toluyl ammonium, tri-ethyl benzyl ammonium, tri-amyl phenyl ammonium, di-methyl di-phenyl ammonium, etc.

Inorganic alkaline-reacting bases, such as alkali or alkali earth hydroxides, may be used for neutralizing if the polymers are to be used in greases rather than in crankcase lubricating oils. The inorganic soaps so formed serve as thickeners, materially reducing the amount of additional soaps required to produce the desired greases.

The extraction method is often preferable, because simultaneously with the removal of the free acids a certain control over the viscosity-raising coefficient and solubility in hydrocarbon oils can be exercised. Solubility in liquid hydrocarbons is largely a function of the paraffinicity of the hydrocarbon oil, viscosity-raising coefficient and oxygen content of the polymer. The oxygen content is more or less fixed, and determined by the choice of the fatty oil, provided polymerization is carried out substantially in the absence of oxidizing reagents. The higher the paraffinicity of the hydrocarbon oil, viscosity-raising coefficient and oxygen content of the polymer, the lower is their mutual solubility. Lubricating oils of a viscosity index of about 100 will, in general, not dissolve an effective amount of my polymers having a viscosity-raising coefficient of 1.5 or higher. To insure perfect solubility of my polymers in highly paraffinic lubricating oil I usually keep the viscosity-raising coefficient of the former between 0.8 and 0.9. On the other hand, less paraffinic oils having a low viscosity index of the order of 40 or lower, are capable of dissolving effective quantities of polymers having a viscosity-raising coefficient of 1½ and up to 2.

By washing polymers with various solvents different results with regard to final acid value and viscosity-raising coefficient can be obtained. These solvents, whose boiling points preferably should be sufficiently low to enable their complete and easy removal by distillation, may or may not contain a small amount of water, which amount, however, should be insufficient substantially to impair the solvent power of the solvent toward fatty oils and/or acids. Normally liquid lower alcohols and ketones, or their mixtures, which contain less than 5 carbon atoms in the molecule, are generally useful for this purpose. Such liquids are methyl, ethyl, propyl, isopropyl, butyl alcohols, acetone and methylethyl ketone. For instance, 96% ethyl alcohol is capable of dissolving unpolymerized fatty acids but not glycerides. Hence by extracting with 96% ethyl alcohol, a polymer of low acidity and substantially unchanged viscosity-raising coefficient can be obtained. Acetone, on the other hand, does not remove free acids quite as effectively as ethyl alcohol, but is capable of selectively dissolving low polymers of the glycerides, and leaving undissolved higher polymers of improved viscosity-raising coefficient. Often two or more solvents may be used in succession, for instance first acetone to raise the coefficient and then ethyl alcohol to lower the acid value.

Unless at least one of the solvents used contains a small amount of water, a separate water wash must precede the extraction to hydrolyze the boron fluoride and remove the liberated hydrofluoboric acid and boric acid. From 2% to 5% of water in any of the alcohols or ketones used for extraction is usually sufficient to effect the hydrolysis.

Below are examples serving to illustrate my process:

Example I

A polymer produced by polymerizing a mixture of 85% rapeseed oil and 15% soya bean oil, having an acid value of 5.4 and a viscosity-raising coefficient of 0.80 was extracted with ½ its own volume of 95% alcohol. The acid number of the extracted polymer was reduced to 1.7 and the viscosity-raising coefficient rose to 0.83.

Example II 120 kilograms of fatty oil consisting of 80% rapeseed oil and 20% soya bean oil were polymerized with 1.46% by weight of boron fluoride at 80° C. for 56 hours. The resulting polymer had a viscosity-raising coefficient of 1.02 and an acid value of 5.75. The polymer dissolved in benzene was then extracted four times with 95% ethyl alcohol, the volume of each charge of alcohol being about ½ the volume of the polymer. The following results were obtained:

| | Wash | Acid No. | Viscosity-raising coefficient |
|---|---|---|---|
| Original polymer | | 5.75 | 1.02 |
| | 1 | 1.65 | 0.90 |
| | 2 | 1.60 | 0.93 |
| | 3 | 1.50 | 0.97 |
| | 4 | 1.45 | 0.94 |

After the last wash the polymer was dried under vacuum to remove benzene and dissolved alcohol, whereupon the polymer was ready for use in lubricating oils.

Example III

A mixture of 80% rapeseed oil and 20% soya bean oil was digested with 1.35% boron fluoride at 80° C. for 56 hours. The resulting polymer was dissolved in about ⅔ of its volume of benzene and the resulting solution was repeatedly washed with aqueous acetone to hydrolyze the boron fluoride and to remove inorganic acids. After removal of the aqueous acetone by decantation and evaporating the benzene, the remaining polymer had an acid value of 5.3 and a viscosity-raising coefficient of 1.26. This polymer was extracted twice with about ⅓ of its volume of 97.5% acetone. The acetone layer was drawn off, dissolved acetone was distilled off and an extracted polymer was obtained having an acid value of 3.7 and a viscosity-raising coefficient of 1.56.

The boron fluoride used in my process may be supplied from an independent source, or it may be generated in any desired manner, in conjunction with my polymerization process, for instance by reacting calcium fluoride with boron tri-oxide and concentrated sulfuric acid; or by reacting an alkali boron fluoride of the type of potassium boron fluoride with concentrated sulfuric acid. Generally, I prefer the method involving the use of alkali boron fluoride, because it is adaptable to the recovery of at least part of the fluor and boron. When at the end of the polymerization reaction the polymer is washed with water, aqueous alcohol or the like, the boron fluoride is hydrolyzed and hydrofluoboric acid and boric acid are dissolved in the aqueous layer. The acid reacting solution, after separation from the polymer, is neutralized with caustic, and thereafter water, alcohol, etc. are removed by distillation. The salt in the remaining concentrated aqueous solution can now be precipitated by salting out, for instance, with potassium chloride, or the water can be fully evaporated to recover the dissolved salt. The recovered salt, after drying, is capable upon reaction with concentrated sulfuric acid of liberating boron fluoride, which may be used to polymerize further quantities of fatty oil.

I claim as my invention:

1. In the process of producing polymers suitable for lubrication from fatty oils by treating with a polymerization catalyst, the improvement comprising treating a semi-drying fatty oil with a small amount of anhydrous boron fluoride, whereby the oil is simultaneously polymerized and hydrolyzed, and maintaining said oil during this treatment at an elevated temperature at which polymerization predominates and hydrolysis is substantially suppressed, for a time sufficient to produce a polymer which is soluble in hydrocarbon oils and capable of materially raising the viscosity of a viscous hydrocarbon oil when dissolved therein in small quantities.

2. The process of claim 1, in which the semi-drying fatty oil has an iodine number between 90 and 125.

3. The process of claim 1, in which the semi-drying fatty oil is a mixture of semi-drying and drying oils of moderate drying quality, said mixture having an iodine number not in excess of 125.

4. The process of claim 1, in which the semi-drying fatty oil is a mixture of a predominating quantity of a semi-drying oil and a drying oil having an iodine number less than 150.

5. The process of claim 1, in which the semi-drying fatty oil is a mixture of rapeseed and soya bean oils.

6. The process of claim 1, in which the semi-drying fatty oil is a mixture of 70-95% rapeseed oil and 30-5% soya bean oil.

7. The process of claim 1, in which a mixture of rapeseed oil and soya bean oil is polymerized at a temperature between 70 and 100° C.

8. The process of claim 1, in which the amount of boron fluoride is between 1 and 2% of the weight of the fatty oil.

9. The process of claim 1, in which the treatment is carried out in the presence of an inert diluent.

10. In the process of producing polymers suitable for lubrication from fatty oils by treating with a polymerization catalyst, the improvement comprising treating a semi-drying fatty oil with a small amount of anhydrous boron fluoride, whereby the oil is simultaneously polymerized and hydrolyzed, maintaining said oil during this treatment at an elevated temperature at which polymerization predominates and hydrolysis is substantially suppressed, for a time sufficient to produce a crude polymer which is soluble in hydrocarbon oils and capable of materially raising the viscosity of a viscous oil when dissolved therein in small quantities, and subjecting the crude polymer to a hydrogenation treatment.

11. In the process of producing polymers suitable for lubrication from fatty oils by treating with a polymerization catalyst, the improvement comprising treating a semi-drying fatty oil with a small amount of anhydrous boron fluoride, whereby the oil is simultaneously polymerized and hydrolyzed, maintaining said oil during this treatment at an elevated temperature at which polymerization predominates and hydrolysis is substantially suppressed, for a time sufficient to produce a crude polymer which is soluble in hydrocarbon oils and capable of materially raising the viscosity of a viscous hydrocarbon oil when dissolved therein in small quantities, and subjecting the crude polymer to a refining treatment to reduce its acid content.

12. In the process of producing polymers suitable for lubrication from fatty oils by treating with a polymerization catalyst, the improvement comprising treating a semi-drying fatty oil with a small amount of anhydrous boron fluoride, whereby the oil is simultaneously polymerized and hydrolyzed, maintaining said oil during this treatment at an elevated temperature at which polymerization predominates and hydrolysis is substantially suppressed, for a time sufficient to produce a crude polymer which is soluble in hydrocarbon oils and capable of materially raising the viscosity of a viscous hydrocarbon oil when dissolved therein in small quantities, dissolving the crude polymer in a non-viscous solvent, subjecting the resulting solution to a refining treatment to reduce its acid content and separating the refined polymer from the solvent.

13. In the process of producing polymers suitable for lubrication from fatty oils by treating with a polymerization catalyst, the improvement comprising treating a semi-drying fatty oil selected from the group consisting of rape seed oil, cotton seed oil, corn oil, sesame oil, rice oil and mustard seed oil with a small amount of anhydrous boron fluoride, whereby the oil is simultaneously polymerized and hydrolyzed, and maintaining said oil during this treatment at an elevated temperature at which polymerization predominates and hydrolysis is substantially suppressed, for a time sufficient to produce a polymer which is soluble in hydrocarbon oils and capable of materially raising the viscosity of a viscous hydrocarbon oil when dissolved therein in small quantities.

14. In the process of producing polymers suitable for lubrication from fatty oils by treating with a polymerization catalyst, the improvement comprising treating a mixture of a predominant quantity of a semi-drying oil selected from the group consisting of rape seed oil, cotton seed oil, corn oil, sesame oil, rice oil and mustard seed oil, and a smaller quantity of a drying oil selected from the group consisting of soya bean oil, sunflower oil and poppy seed oil, said mixture having an iodine number below 125, with a small amount of anhydrous boron fluoride, whereby the oil is simultaneously polymerized and hydrolyzed, and maintaining said oil during this treatment at an elevated temperature at which polymerization predominates and hydrolysis is substantially suppressed, for a time sufficient to produce a polymer which is soluble in hydrocarbon oils and capable of materially raising the viscosity of a viscous hydrocarbon oil when dissolved therein in small quantities.

15. In the process of producing polymers suitable for lubrication from fatty oils by treating with a polymerization catalyst, the improvement comprising treating a semi-drying fatty oil having an iodine number between 90 and 125 with 1 to 2% boron fluoride at a temperature between 70° and 100° C. for a period sufficient to produce a polymer having a viscosity raising coefficient substantially greater than .5, but insufficient to raise the organic acidity of the polymers to above 10 milligrams KOH per gram of the polymer, said viscosity raising coefficient being determined by the formula $$\frac{\log V_E - \log V_A}{6} \times 29.54$$

in which $V_E$ is the viscosity at 50° C. in Saybolt seconds of a blend of 6% of said polymer in a viscous hydrocarbon oil, and $V_A$ is the viscosity at 50° C. in Saybolt seconds of the viscous hydrocarbon oil itself.

EGON EICHWALD.